US006867798B1

(12) United States Patent
Wada et al.

(10) Patent No.: US 6,867,798 B1
(45) Date of Patent: Mar. 15, 2005

(54) MONITOR CAMERA SYSTEM AND METHOD OF DISPLAYING PICTURE FROM MONITOR CAMERA THEREOF

(75) Inventors: Jyoji Wada, Yokohama (JP); Koji Wakiyama, Yokohama (JP); Haruo Kogane, Kawasaki (JP); Noboru Takada, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 309 days.

(21) Appl. No.: 09/649,589

(22) Filed: Aug. 29, 2000

(30) Foreign Application Priority Data

Aug. 31, 1999 (JP) .......................................... 11-246198

(51) Int. Cl.[7] ................................................ H04N 7/18
(52) U.S. Cl. ........................ 348/143; 348/348; 348/144
(58) Field of Search ..................... 348/36–39, 143–160, 348/211–215

(56) References Cited

U.S. PATENT DOCUMENTS

| 4,945,367 A | | 7/1990 | Blackshear |
| 5,262,869 A | | 11/1993 | Hong |
| 5,923,364 A | * | 7/1999 | Rhodes et al. .............. 348/159 |
| 5,937,096 A | * | 8/1999 | Kawai ......................... 382/236 |
| 6,191,842 B1 | * | 2/2001 | Navarro ....................... 352/38 |
| 6,262,768 B1 | * | 7/2001 | Williams ................. 348/217.1 |
| 6,476,857 B1 | * | 11/2002 | Agatsuma et al. .......... 348/152 |
| 6,509,926 B1 | * | 1/2003 | Mills et al. ................. 348/143 |

FOREIGN PATENT DOCUMENTS

| EP | 0 884 909 | 12/1998 |
| JP | 60-194691 | 10/1985 |
| JP | 04-156786 | 5/1992 |
| JP | 5-68202 | 3/1993 |

* cited by examiner

Primary Examiner—Andy Rao
(74) Attorney, Agent, or Firm—McDermott Will & Emery LLP

(57) ABSTRACT

In a monitor camera system capable of understanding a direction, a monitor camera follows, through a picture taken by the monitor camera, the monitor camera makes 360-degree pan rotation and 180-degree tilt rotation, and generates image data in which a character representative of a photographing direction (for example, north) of the monitor camera is superimposed on a picture taken by the monitor camera. Accordingly, the monitor camera provides a picture in which the photographing direction indicating character appears. This enables an operator to easily understand the camera direction through the monitor picture, thus achieving efficient and accurate camera manipulation.

30 Claims, 15 Drawing Sheets

| PAN ANGLE | TILT ANGLE | DISPLAY |
|---|---|---|
| 0±a0 | b1 → 90 | EAST |
| 0±a0 | -b1 → -90 | WEST |
| 45±a0 | b1 → 90 | NORTHEAST |
| 45±a0 | -b1 → -90 | SOUTHWEST |
| 90±a0 | b1 → 90 | NORTH |
| 90±a0 | -b1 → -90 | SOUTH |
| 135±a0 | b1 → 90 | NORTHWEST |
| 135±a0 | -b1 → -90 | SOUTHEAST |
| 180±a0 | b1 → 90 | WEST |
| 180±a0 | -b1 → -90 | EAST |
| 225±a0 | b1 → 90 | SOUTHWEST |
| 225±a0 | -b1 → -90 | NORTHEAST |
| 270±a0 | b1 → 90 | SOUTH |
| 270±a0 | -b1 → -90 | NORTH |
| 315±a0 | b1 → 90 | SOUTHEAST |
| 315±a0 | -b1 → -90 | NORTHWEST |

FIG. 9

| PAN ANGLE | TILT ANGLE | DISPLAY |
|---|---|---|
| $0 \pm a0$ | $b1 \rightarrow b2$ | EAST LOWER |
| $0 \pm a0$ | $b2 \rightarrow b3$ | EAST MIDDLE |
| $0 \pm a0$ | $b3 \rightarrow 90$ | EAST UPPER |
| $0 \pm a0$ | $-b1 \rightarrow -b2$ | WEST LOWER |
| $0 \pm a0$ | $-b2 \rightarrow -b3$ | WEST MIDDLE |
| $0 \pm a0$ | $-b3 \rightarrow -90$ | WEST UPPER |
| ⋮ | ⋮ | ⋮ |

FIG. 10A
| PAN ANGLE | TILT ANGLE | DISPLAY |
|---|---|---|
| (0+a0)→45/2 | b1→90 | EAST→ |
| (0+a0)→45/2 | -b1→-90 | WEST→ |
| 45/2→(45-a0) | b1→90 | ←NORTHEAST |
| 45/2→(45-a0) | -b1→-90 | ←SOUTHWEST |
| : | : | : |
FIG. 10B
| PAN ANGLE | TILT ANGLE | DISPLAY | DISPLAY POSITION |
|---|---|---|---|
| (0+a0)→45/2 | b1→90 | EAST→ | RIGHT LOWER |
| (0+a0)→45/2 | -b1→-90 | WEST→ | RIGHT LOWER |
| 45/2→(45-a0) | b1→90 | ←NORTHEAST | LEFT LOWER |
| 45/2→(45-a0) | -b1→-90 | ←SOUTHWEST | LEFT LOWER |
| : | : | : | : |
FIG. 10C
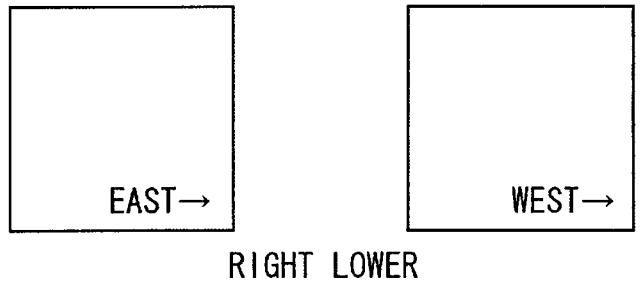
RIGHT LOWER
FIG. 10D
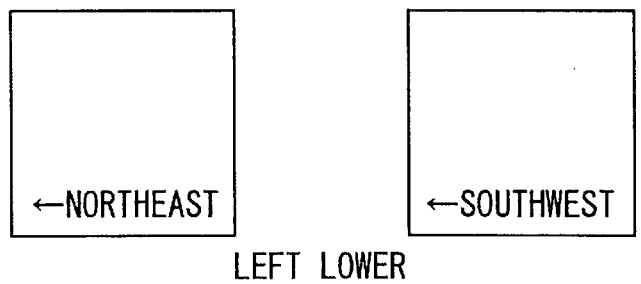
LEFT LOWER

FIG. 11

|  | PAN ROTATION ANGLE | TILT ROTATION ANGLE |
|---|---|---|
| FIRST PATH | P0-Pt | \|T0\|-\|Tt\| |
| SECOND PATH | 360-P0-Pt | \|T0\|-\|Tt\| |
| THIRD PATH | P0-(Pt+180) | \|T0\|+\|Tt\| |
| FOURTH PATH | 180-P0-Pt | \|T0\|+\|Tt\| |

FIG. 12

| PAN ANGLE | TILT ANGLE | DISPLAY |
|---|---|---|
| $(0+\alpha)\pm a0$ | $b1 \rightarrow 90$ | EAST |
| $(0+\alpha)\pm a0$ | $-b1 \rightarrow -90$ | WEST |
| $(45+\alpha)\pm a0$ | $b1 \rightarrow 90$ | NORTHEAST |
| $(45+\alpha)\pm a0$ | $-b1 \rightarrow -90$ | SOUTHWEST |
| ⋮ | ⋮ | ⋮ |

| PAN ANGLE | TILT ANGLE | DISPLAY |
|---|---|---|
| m1±a0 | n1±b0 | DOOR 1 |
| (m1+180)±a0 | −n1±b0 | DOOR 1 |
| m2±a0 | n2±b0 | DOOR 2 |
| (m2+180)±a0 | −n2±b0 | DOOR 2 |
| m3±a0 | n3±b0 | ENTRANCE |
| (m3+180)±a0 | −n3±b0 | ENTRANCE |
| ⋮ | ⋮ | ⋮ |

MONITOR CAMERA SYSTEM AND METHOD OF DISPLAYING PICTURE FROM MONITOR CAMERA THEREOF

BACKGROUND OF THE INVENTION

1. Field of the Invention

The present invention relates to a monitor (surveillance) camera system covering 360-degree monitoring area and to a method of displaying a picture from a monitor camera thereof, and more particularly to means whereby a direction or the like, a camera takes, is easily understandable through a screen.

2. Description of the Related Art

So far, a monitor camera in which a camera and a rotatable table therefor are placed in a dome-like housing has been put on the market. This monitor camera is called a "compound camera" because of the camera being capable of, through movements of the rotatable tables, rotating horizontally (pan) while rotating vertically (tilt). The compound camera can rotate through 360 degrees without limitation in the pan directions, while rotating in an angular range between 0 degree and 90 degrees, that is, from a horizontal direction to a vertical direction, in the tilt directions. In addition, through the manipulation of a controller, this compound camera can take a photograph at a desired angle or in a desired direction in a state installed on a ceiling of public facilities or the like. Still additionally, even if a target subject passes right under it, as FIG. 19 shows, immediately a camera 10 turns to right under, it can rotate 180 degrees around a lens thereof to chase the target subject continuously, thus providing pictures throughout a monitoring area.

FIG. 20 is an illustration of a state in which a controller 12 for controlling a compound camera 11 and a monitor 13 for displaying a picture taken through the compound camera 11 are connected through a coaxial cable 16 to the compound camera 11. The controller 12 functions as a control element and comprises a joystick 14 and a numeric pad (numeric keys) 15.

This compound camera 11 is designed so that a plurality of camera positions, for example, taking a direction to an entrance, a direction to an exit and a direction to a window, are preset in the controller 12 in the form of identification numbers (ID). After preset, simply by inputting the ID corresponding to a camera position through the use of the numeric pad 15, the camera can be turned to take the preset direction.

In addition, the joystick 14 of the controller 12 is manipulated for controlling the moving (rotating) speed of the camera 11. When the joystick 14 is tilted, as shown in FIG. 18, the camera 11 rotates in a tilting direction at a speed proportional to the movement component of the joystick 14 in the vertical-axis direction and rotates in a panning direction at a speed proportional to the movement component thereof in the horizontal-axis direction. An operator checks pictures while viewing the monitor 13 and, when the rotating camera 11 catches a desired direction, the operator returns the joystick 14 to the neutral position to stop the rotation thereof in the tilting and panning directions.

Meanwhile, a group including the inventors of the present invention has developed a new compound camera capable of limitlessly rotating 360 degrees in panning directions while rotating 180 in tilting directions. This compound camera can provide the increased degree of freedom in moving direction and, hence, is capable of moving promptly to the target camera position through the shortest path. In addition, this compound camera can set the field angle in the zoom-up condition at approximately two degrees to allow an enlarged display of a local area.

However, when a camera has a high degree of freedom in moving direction and a high zooming ability, difficulty is encountered in understanding what place a picture displayed shows. Therefore, in a case in which the camera direction is controlled remotely to monitor a monitoring area while zooming in the enlarging direction, there exist problems in that difficulty is experienced in understand the place to which the camera faces and further in understanding the direction the camera takes to face to the target place.

SUMMARY OF THE INVENTION

Accordingly, the present invention has been developed with a view to eliminating these problems, and it is an object of the invention to provide a monitor camera system and a picture displaying method, which are capable of recognizing a camera direction through a picture.

For this purpose, in accordance with an aspect of the present invention, there is provided a monitor camera system comprising a monitor camera having at least one revolution axis, the monitor camera generates and outputs image data in which a character for indicating a photographing direction of the monitor camera is superimposed on a picture taken by the monitor camera.

In this monitor camera system, the indicating character is a direction indicating character representative of an azimuth, or a name indicating character representative of a name of a target.

Furthermore, the monitor camera includes a memory retaining a table setting the relationship between at least one of a pan angle and a tilt angle and the indicating character, and when one of the present pan angle and tilt angle of the monitor camera agrees with one of an pan angle and a tilt angle set in the table, the corresponding indicating character is superimposed according to the relationship set in the table. In this case, a tilt angle in the table is determined so that the indicating character does not appear until a direction of the monitor camera reaches a predetermined angle with respect to its right-under direction. Still furthermore, one of a pan angle and a tilt angle in the table is set as an angle range containing a tolerance. The tolerance is set as a function of a zoom quantity and is set to be smaller as a picture to be displayed has a smaller field angle. Still furthermore, in the table, a guide indicator based on a combination of the indicating character and a direction indicating symbol is set for a pan angle range which is out of the tolerance.

In addition, when a photographing direction indication is made using a character corresponding to the indicating character set in the table, a position of the monitor camera is controlled to make a pan angle and a tilt angle set in the table in a state related to the indicating character. Still additionally, in a case in which a target name indicating character is set in the table, an indicating character representative of a photographing direction is inputted to the monitor camera, all name indicating characters including the indicating character are extracted from the table so that a camera position of the monitor camera is controlled successively to pan angles and tilt angles set in a state related to all the extracted name indicating characters.

Moreover, in this monitor camera, all pan angles set in the table stored in the memory are corrected simultaneously in a manner that a camera position of the monitor camera is checked with one direction. It is also appropriate that a direction sensor is provided for the checking of the camera position. Still moreover, a table for setting the relationship between one of a pan angle and a tilt angle and a direction indicating character representative of a camera direction and a table for setting the relationship between one of a pan angle and a tilt angle and a name indicating character representative of a target name are stored in the memory, and when one of the pan angle and the tilt angle in one table overlaps with one of the pan angle and the tilt angle in the other table, priority on designation of the indicating character is given to the one table.

Furthermore, in a case in which the monitor camera is in rotation to change its direction in response to an instruction for rotation, when one of the present pan angle and the present tilt angle agrees with one of the pan angle and the tilt angle, the monitor camera implements independent control to reduce its own rotating speed.

In addition, in accordance with another aspect of the present invention, there is provided a picture displaying method for use in a monitor camera system comprising a monitor camera having at least one revolution axis, a character for indicating a photographing direction of the monitor camera being superimposed on a picture, taken by the monitor camera, in the monitor camera before displayed. In this case, the indicating character to be superimposed and displayed is a direction indicating character representative of an azimuth, or is a name indicating character representative of a name of a target.

Furthermore, it is also appropriate that the indicating character is not displayed until a direction of the monitor camera reaches a predetermined angle with respect to its right-under direction, or that, in a case in which one of a pan angle and tilt angle of the monitor camera is shifted from one of correct pan and tilt angles, the indicating character is displayed when the pan angle or the tilt angle is within a tolerance. The tolerance is set to be smaller as a picture to be displayed has a smaller field angle, and is set by an operator. In addition, it is also appropriate that a difference between one of a pan angle and tilt angle of the monitor camera and one of a correct pan angle and a correct tilt angle is displayed, or that, in a case in which a pan angle of the monitor camera is out of the tolerance with respect to a correct pan angle, a guide indicator based on a combination of an indicating character corresponding to the most nearby correct pan angle and a direction indicating symbol showing a direction to the most nearby correct angle is displayed. The guide indicator can also be displayed in a state shifted in a direction the direction indicating symbol points out on a screen, or displayed only when the monitor camera is driven through a manipulation. In addition, when the direction indicating character is displayed as the indicating character, the direction indicating character can also be displayed in a state where an indicator set according to division of a tilt angle range taken by the monitor camera is added thereto.

Still furthermore, it is also appropriate that, when a field angle of the picture taken by the monitor camera exceeds a predetermined value, the display of the indicating character does not take place, that the indicating character is displayed only when a moving speed of the monitor camera assumes zero, that the direction indicating character and a name indicating character representative of a name of an object are displayed as the indicating character, or the direction indicating character indicative of a photographing direction of the monitor camera and a name indicating character indicative of a name of a target existing in the photographing direction are displayed as the indicating character.

Moreover, it is also acceptable that priority is given to one of the direction indicating character indicative of a photographing direction of the monitor camera and a name indicating character indicative of a name of a target existing in the photographing direction, and only the one indicating character to which the priority is given is displayed as the indicating character. Still moreover, it is also possible that the indicating character is shifted on a screen in synchronism with movement of the picture. In this case, the shifting of the indicating character on the screen is adjustable in accordance with a moving speed of the monitor camera and a field angle of the picture.

BRIEF DESCRIPTION OF THE DRAWINGS

Other objects and features of the present invention will become more readily apparent from the following detailed description of the preferred embodiments taken in conjunction with the accompanying drawings in which:

FIG. 9 is an illustration of a table to be held in the compound camera according to the first embodiment of the invention, for when an indicating character is changed in accordance with a tilt angle range;

FIGS. 10A and 10B are illustrations of tables defining a guide display for when a tolerance is exceeded, in the compound camera according to the first embodiment of the invention;

FIGS. 10C and 10D are illustrations of guide display modes in the compound camera according to the first embodiment of the invention;

FIG. 11 is an illustration of data indicative of a pan rotation angle and a tilt rotation angle for each of moving paths (routes), which is used to calculate the optimum path in the compound camera according to the first embodiment of the invention;

FIG. 12 is an illustration of a correction state of a table held in the compound camera according to the first embodiment of the invention;

DETAILED DESCRIPTION OF THE INVENTION

Embodiments of the present invention will be described hereinbelow with reference to the drawings.

(First Embodiment)

Figure 13:
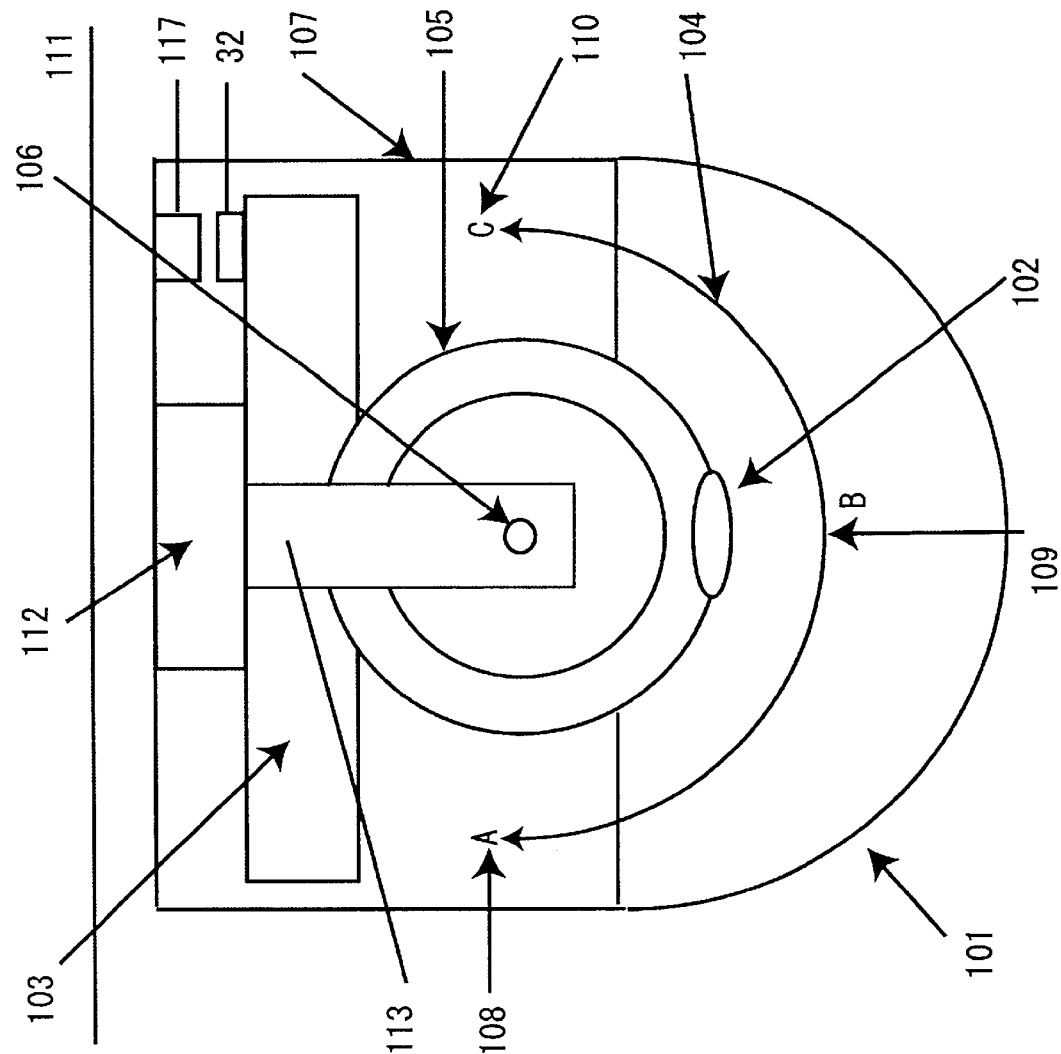
FIG. 13 is a side cross-sectional view showing a construction of the compound camera according to the invention.
Figure 14:
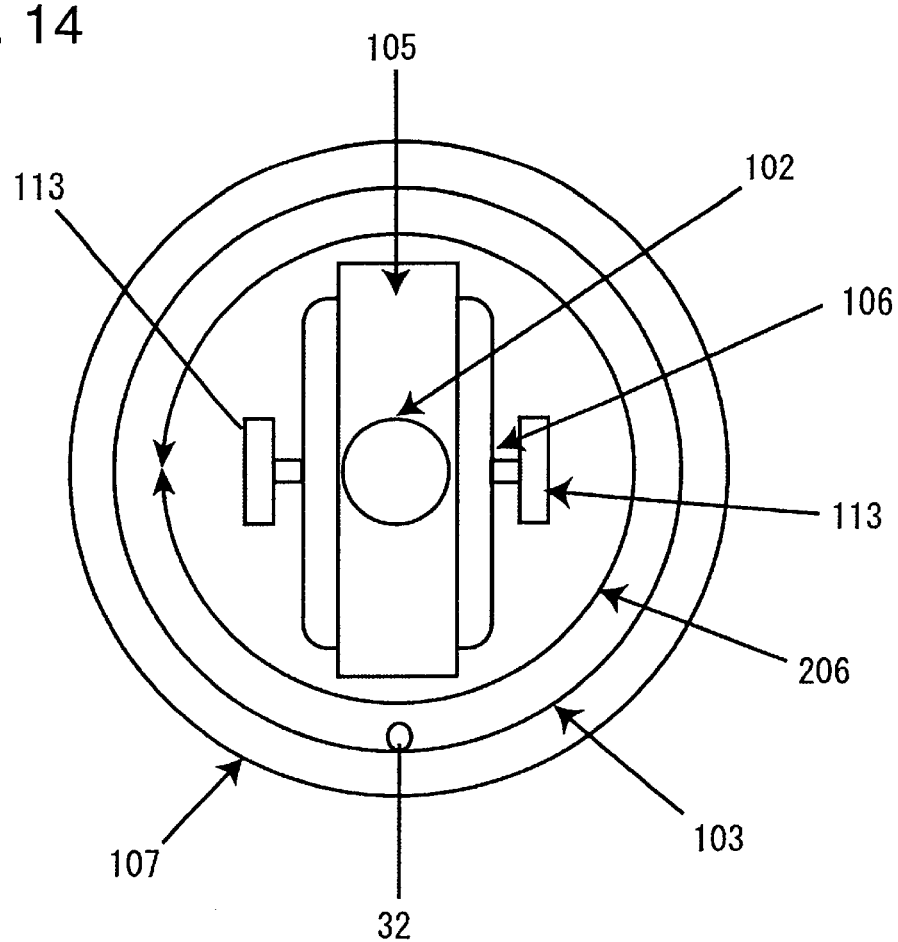
FIG. 14 is a plan cross-sectional view showing the construction of the compound camera according to the invention.

As a compound camera according to the present invention, as the side cross-sectional view of FIG. 13 and the plan view of FIG. 14 show, a housing comprising a cylindrical camera base 107 and a semi-spherical camera cover 101 accommodates a monitor camera 102, a rotatable tilt table 105 for holding the camera 102 directly, a rotatable pan table 103 capable of limitlessly rotating 360 degrees, a pair of columns 113 planted on the rotatable pan table 103, a tilt rotary shaft 106 for rotatably supporting the rotatable tilt table 105 with respect to the columns 113, and a slip ring 112 acting as a contact for supply of power into the housing or for input/output of electrical signals. Although omitted from the illustration, the compound camera is additionally equipped with a rotating mechanism for the rotatable pan table 103 and the rotatable tilt table 104, a motor functioning as a rotational drive source, a drive control section for the motor, an amplifying circuit for amplifying video signals, and a control section for controlling an operation of the compound camera system. In addition, a magnet 117 is fixed at an origin position for determining the origin of rotation in the panning direction, while a home-position (origin) Hall element 32 is placed on the rotatable pan table 103 for detecting a magnetic field from the magnet 117.

The rotatable tilt table 105, holding the camera 102, is rotatable through 180 degrees around the tilt rotary shaft 106 and, therefore, the camera 102 is reversibly rotatable from a point A (designated at numeral 108 in FIG. 13) through a lowermost point B (designated at numeral 109 in FIG. 13) to a point C (designated at numeral 110 in FIG. 13).

On the other hand, the rotatable pan table 103 is rotatable horizontally through 360 degrees as indicated by a rotation locus (designated at numeral 206 in FIG. 14).

Furthermore, the slip ring 112 realizes the supply of power from a fixed section to a moving section and the communication of electric signals between the fixed section and the moving section in the compound camera system.

Accordingly, when this compound camera is installed, for example, on a ceiling 111, the camera 102 takes a photograph on a monitoring area in all directions in a manner that the angle of rotation of the rotatable tilt table 105 is controlled remotely and the rotatable pan table 103 is rotated in a predetermined direction.

Figure 2:
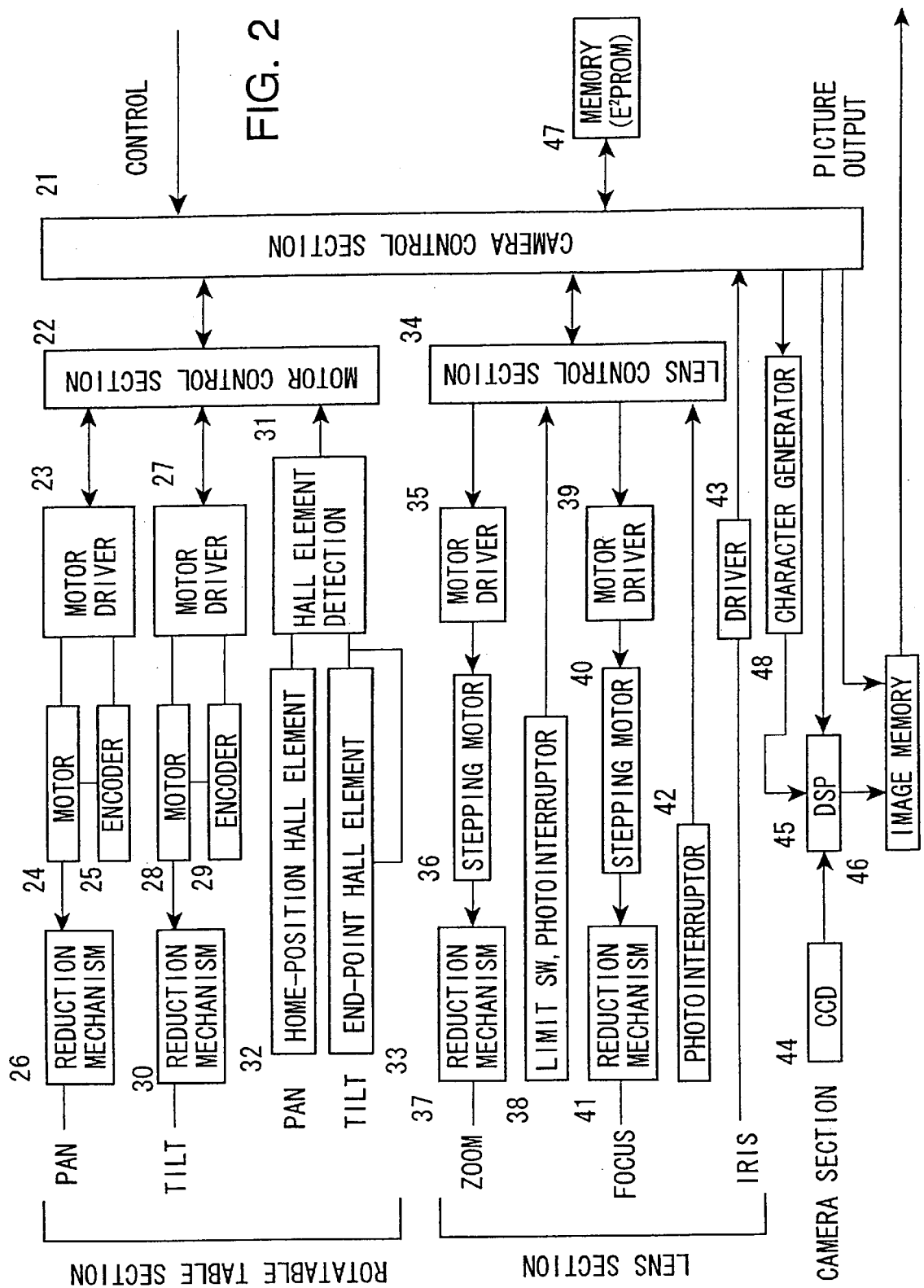
FIG. 2 is a block diagram showing a configuration of a compound camera according to the invention.

FIG. 2 is a functional block diagram showing an internal configuration of the compound camera. As a rotation control mechanism for the rotatable pan table 103 and the rotatable tilt table 105, there are provided motors 24, 28, encoders 25, 29 for detecting speeds of rotation (revolutions) of the motors 24, 28 motor drivers 23, 27 for driving the motors 24, 28 on the basis of the detection results of the encoders 25, 29, reduction mechanisms 26, 30 for reducing the rotation of the motors 24, 28 to transmit the reduced rotation to the rotatable pan table 103 and the rotatable tilt table 105, respectively, an origin Hall element 32 placed on the rotatable pan table 103 and sensitive to a magnetic field of the magnet 117 situated at the pan origin, end-point Hall elements 33 located 180 degrees apart on the rotatable tilt table 105 and sensitive to magnetic fields of magnets placed at tilt end-point positions, a Hall element signal detecting section 31 for detecting the pan origin and the tilt end points on the basis of detection signals from the Hall elements 32, 33, and a motor control section 22 for controlling the motor drivers 23, 27 in accordance with the detection results of the Hall element detecting section 31.

In addition, as a control mechanism for a camera lens section, there are provided stepping (stepper) motors 36, 40 for zoom and focus adjustments, motor drivers 35, 39 for outputting drive pulses to the stepping motors 36, 40, respectively, reduction mechanisms 37, 41 for reducing the rotation of the stepping motors 36, 40 to transmit the reduced rotation to lens mechanisms, respectively, a limit switch (or photointerruptor) 38 for detecting the limit of the zoom adjustment, a photointerruptor 42 for detecting the limit of the focus adjustment, a lens control section 34 for controlling the motor drivers 35, 39, and a driver 43 for adjusting the iris.

Further, a camera section, outputting a video signal, is composed of an image pickup device (CCD) 44, a DSP 45 for encoding a video signal, a character generator 48 for generating characters or figures to be superimposed on pictures, and an image memory 46 in and from which image data is writable and readable.

Moreover, in the system, are included a camera control section 21 for controlling an operation of the compound camera system in accordance with a control signal from a controller (not shown), and a memory ($E^2PROM$) 47 for storing data.

Figure 3:
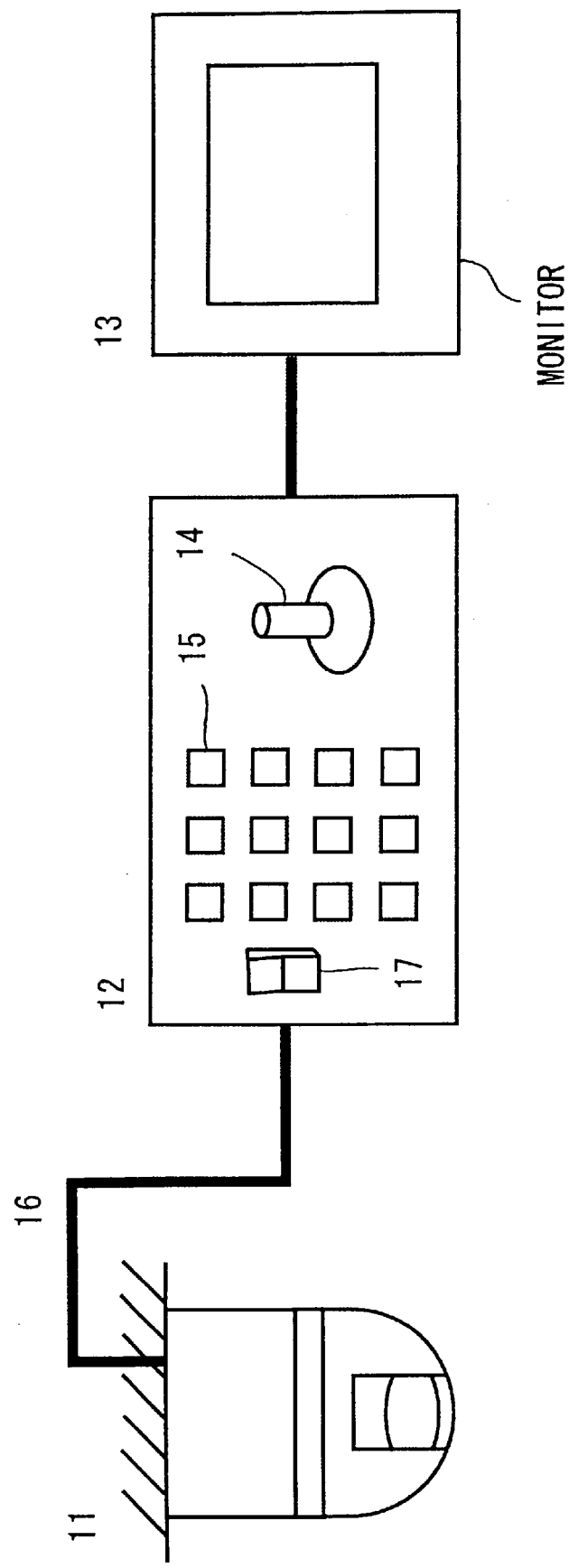
FIG. 3 is an illustration of a control system of the compound camera system according to the first embodiment of the invention.

As FIG. 3 shows, a controller 12 for controlling a compound camera 11 and a monitor 13 for displaying a picture taken through the compound camera 11 are connected through a coaxial cable 16 to the compound camera 11. The controller 12 functions as a control element, and comprises a joystick 14 and a numeric pad (numeric keys) 15, and, as will be described later, further includes a switch 17 for selectively conducting the switching between display and non-display of a direction indicating character.

Figure 4:
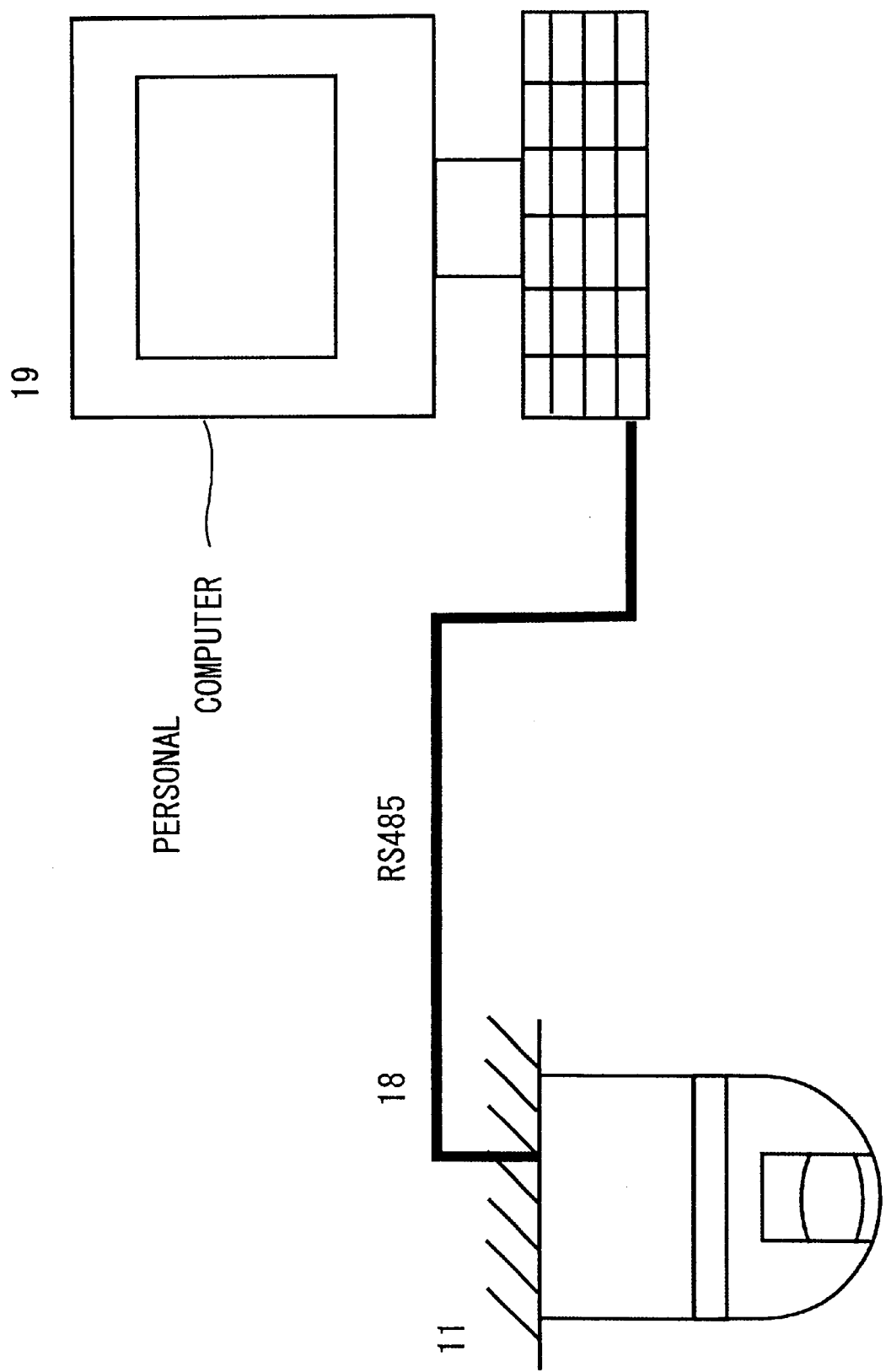
FIG. 4 is an illustration of another control system of the compound camera system according to the first embodiment of the invention.

Furthermore, as FIG. 4 shows, the compound camera 11 can also be connected through RS485 serial communication 18 to a personal computer 19 so that a compound camera 11 is controlled through the personal computer 19 with a picture taken by the compound camera 11 and displayed on a screen of the personal computer 19.

In the illustration, although one compound camera 11 is connected to the controller 12 or the personal computer 19, it is also possible that a plurality of compound cameras are connected to the controller 12 or the personal computer 19 to be controlled therethrough.

In this compound camera 11, the output pulses of the encoder 25 for detecting the rotation of the motor 24 in a panning direction is sent to the motor control section 22, and a point of time at which the home-position element 32 has detected the pan origin is communicated through the Hall element signal detecting section 31 to the motor control section 22. When the number of pulses to be outputted from the encoder 25 while the rotatable pan table 103 makes one revolution (during one revolution of rotatable pan table 103) is taken as p, the motor control section 22 counts the number m of output pulses of the encoder 25 from when the Hall element 32 has detected the pan origin to calculate the present pan angle Pt according to the following equation. The present pan angle Pt calculated thus is preserved in the memory 47.

$$Pt = m \times 360/p$$

Likewise, the output pulses of the encoder 29 which detects the rotation of the motor 28 in a tilt direction are forwarded to the motor control section 22, and the point of time at which the tilt end point has been detected by the end-point Hall element 33 is communicated through the Hall element signal detecting section 31 to the motor control section 22. When the number of pulses to be outputted from the encoder 29 while the rotatable tilt table 105 makes half a revolution (during half revolution of rotatable tilt table 105) is taken as q, the motor control section 22 counts the number n of output pulses of the encoder 29 from when the end-point Hall element 33 has detected a tilt end point, and calculates the present tilt angle Tt according to the following equation.

$$Tt = 90 - (n \times 180/q)$$

That is, the tilt angle is taken as 0 when the camera 102 face downwardly (right under) and the tilt angle is calculated with respect to the right-downward direction. The possible tilt angle ranges from +90 degrees to −90 degrees. The present tilt angle Tt calculated is retained in the memory 47.

Furthermore, the field angle of a picture to be photographed by the lens section depends upon the rotating quantity of the stepping motor 36 determining the zooming quantity, while the rotating quantity thereof depends upon the number of pulses to be outputted to the stepping motor 36. Likewise, the focal length depends upon the number of pulses to be outputted to the stepping motor 40. When counting a pulse for rotating each of the stepping motors 36 and 46, the lens control section 34 counts it as "plus" when each of the stepping motors 36 and 46 is rotated forwardly, while counting it as "minus" when each of the stepping motors 36 and 46 is rotated reversely, thus cumulatively calculating the number of pulses outputted from each of the motor drivers 35 and 39. These numbers of pulses cumulatively calculated are retained in the memory 47 as data representative of the present field angle Zt and the focal length Ft.

In this way, the values Pt, Tt, Zt and Ft are preserved in the memory 47 as data representative of the present quantity of state of the compound camera.

Figure 1:
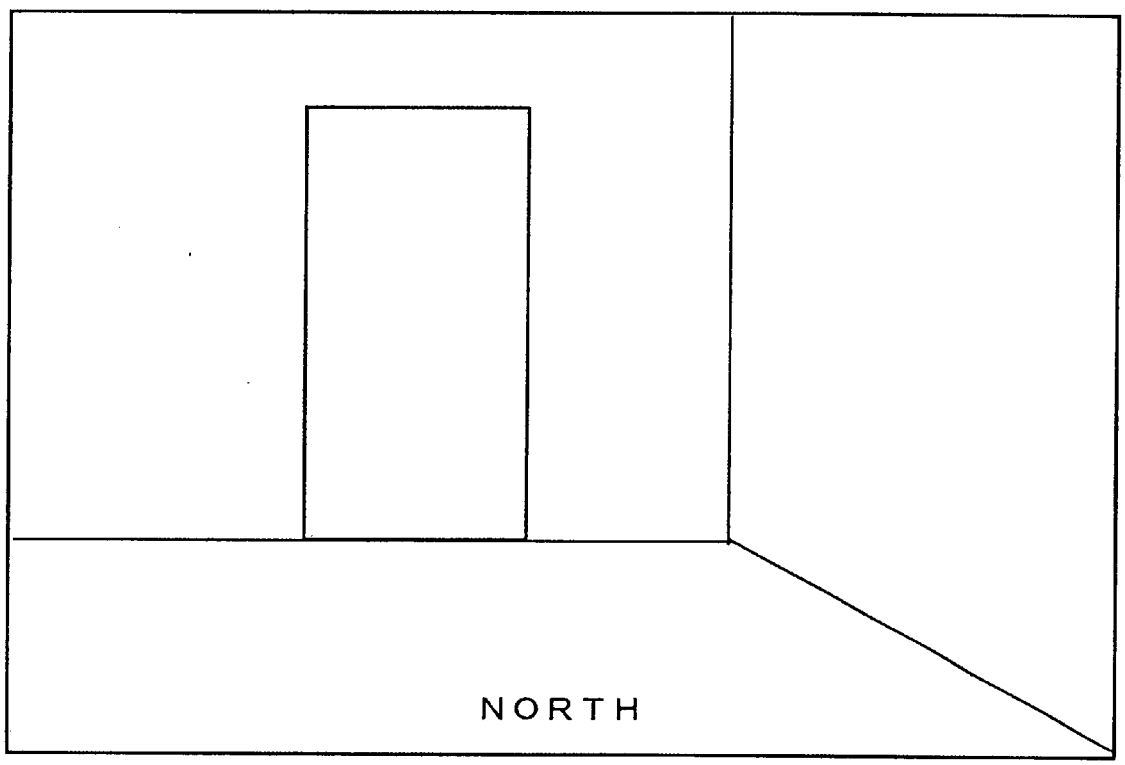
FIG. 1 is an illustration of an example of a picture to be displayed by a compound camera system according to a first embodiment of the present invention.
Figures 7, 8:
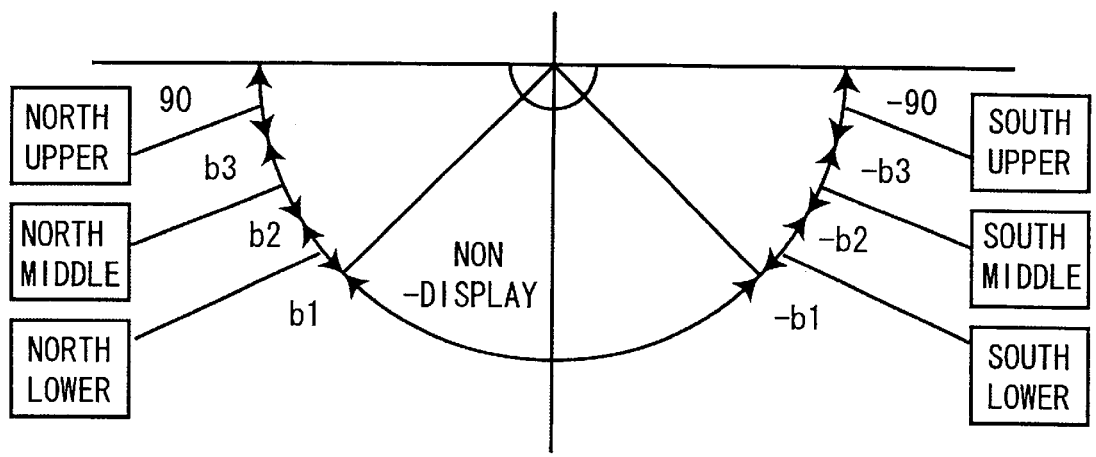
FIG. 7 is an illustration of a table to be held in the compound camera according to the first embodiment of the invention.
FIG. 8 is an illustration of the relationship between a tilt angle range and an indicating character in the compound camera according to the first embodiment of the invention.

In addition, in this compound camera, as FIG. 1 shows, a direction (azimuth) is displayed in a state superimposed on a picture; therefore, a table (direction designation table) shown in FIG. 7 is retained in the memory 47. In this table, are written pan angle ranges, tilt angle ranges and a code of characters (direction indicating characters or character strings) each to be displayed on a screen when a pan angle and a tilt angle exist in the corresponding ranges.

Figure 5:
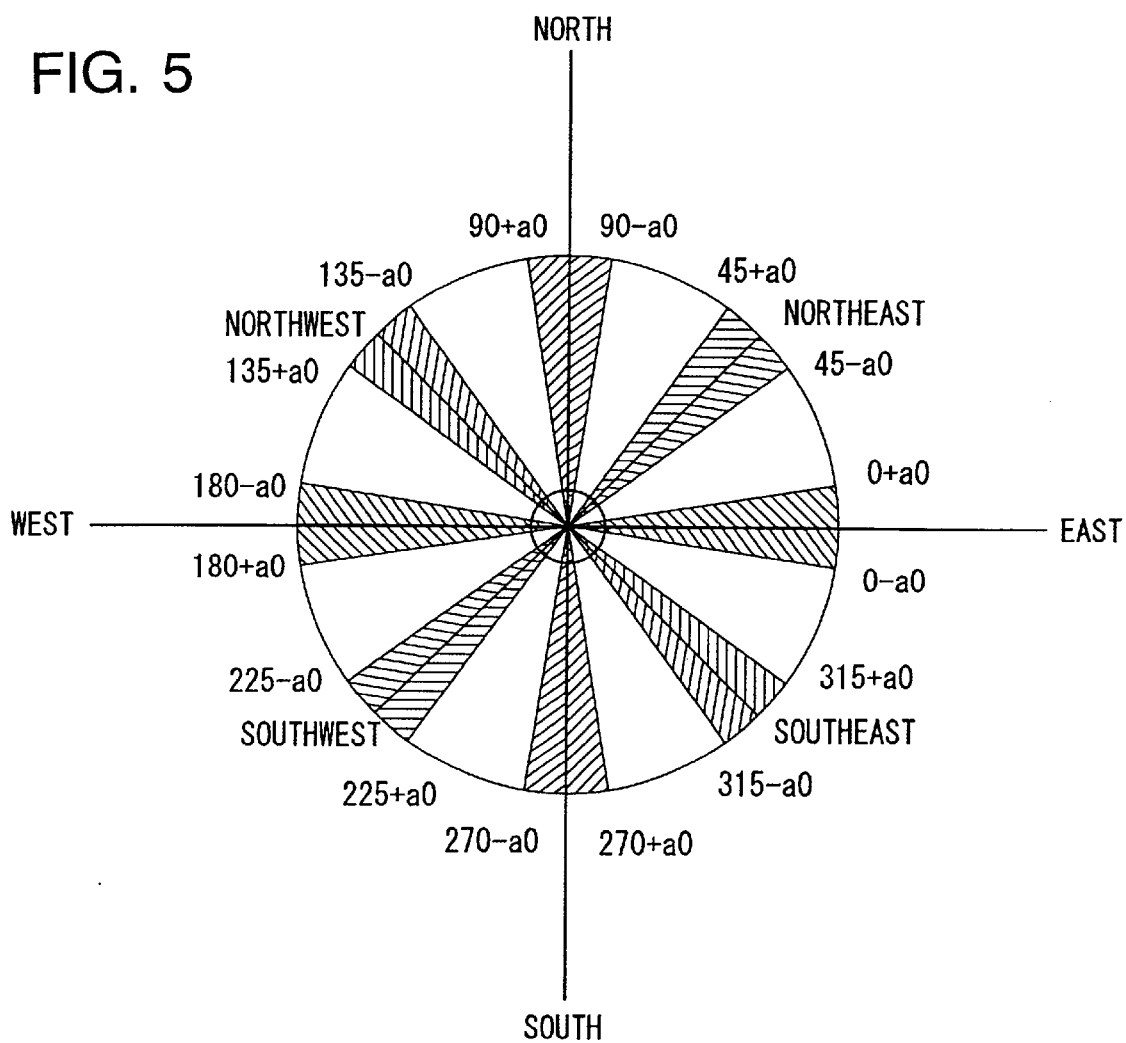
FIG. 5 is an illustration of the relationship between a direction and a pan angle in a compound camera according to the first embodiment of the invention.
Figure 6:
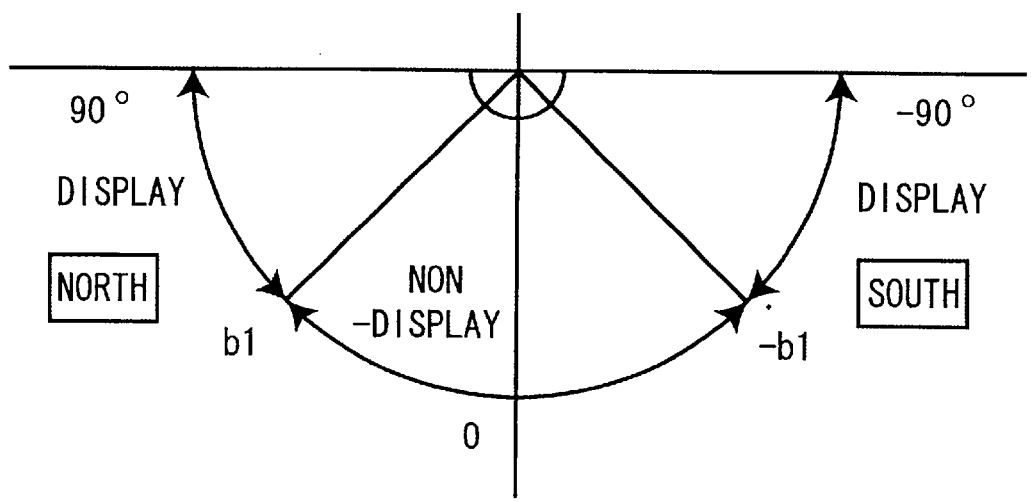
FIG. 6 is an illustration of the relationship between a tilt angle and display/non-display of an indicating character in the compound camera according to the first embodiment of the invention.

FIG. 5 is an illustration of a pan angle range in which a direction indicating character appears, while FIG. 6 is an illustration of a tilt angle range in which a direction indicating character appears. When the tilt angle is between b1 and −b1, that is, when the camera installed on a ceiling follows the nearly right-under direction, irrespective of the pan angle, no display of a direction indicating character takes place. This is because, while a picture of a floor portion appears, it is considered that it is less worth providing direction information.

When the tilt angle is between b1 and 90 degrees or when the tilt angle is between −b1 and −90 degrees as shown in FIG. 6, if the pan angle is in the ranges shown by oblique lines, the corresponding direction indicating character is displayed at a lower end portion of the screen as shown in FIG. 1.

In this case, it is to be noted that, even if the same pan angle is made, different direction indicating characters appear between a case in which the tilt angle is b1→90 degrees and a case in which −b1→−90 degrees. For example, when the pan angle is 45 degrees, if the tilt angle is in the range of b1→90 degrees, the character "northeast" appears, and when the tilt angle is in the range of −b1→−90 degrees, the character "southwest" opposite to "northeast" appears.

In the illustration, as one example, there are eight directions: "east", "north", "west", "south", "northeast", "northwest", "southeast" and "southwest". Even if the pan angle shifts by an angle a0 to the plus side or the minus side with respect to each of these directions, a display of the corresponding direction indicating character takes place.

All these relationships are described in the direction designation table shown in FIG. 7. Incidentally, in this table, naturally the value of b1 defining a tilt angle can also be set at 0.

The operation of this compound camera 11 is under control of the controller 12 shown in FIG. 3 or under control of the personal computer 19 shown in FIG. 4. The controller 12 or the personal computer 19 issues a command, and the camera control section 21 of the compound camera 11 interprets the received command to control the operation of each portion.

Figure 18:
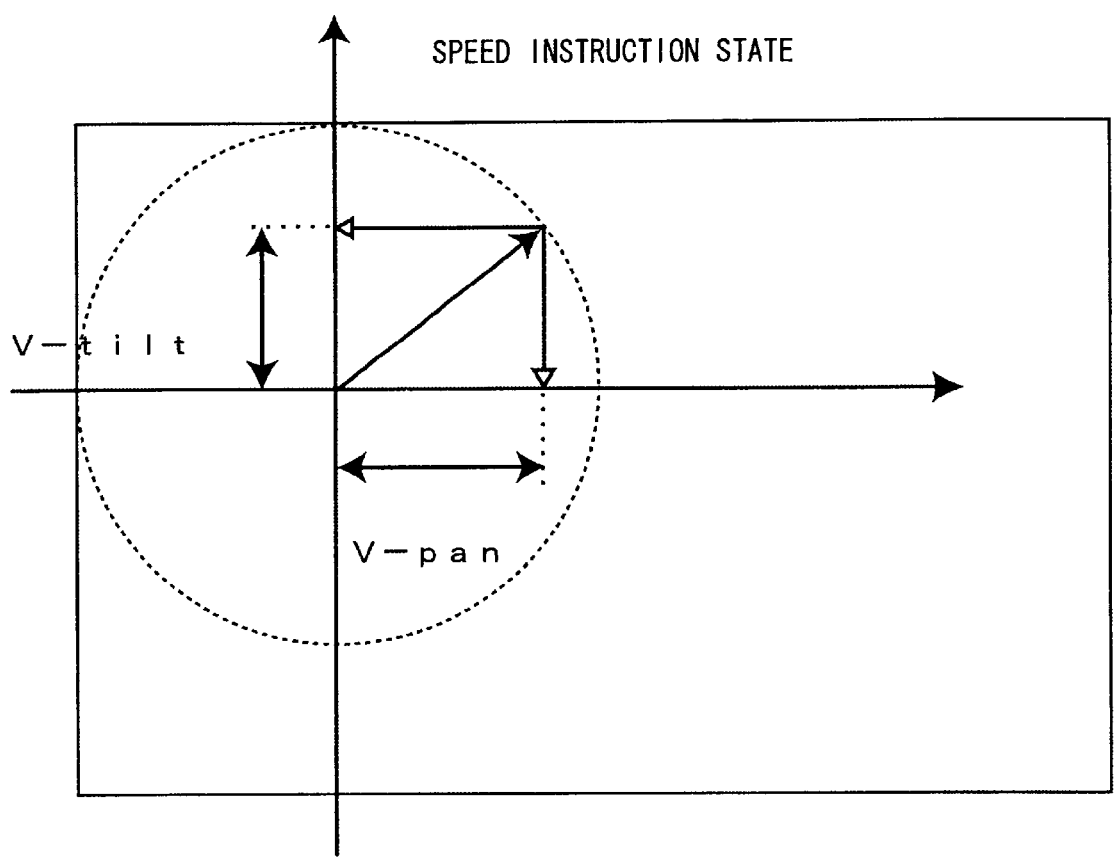
FIG. 18 is an illustration for describing camera speed control in a compound camera system.
Figure 19:
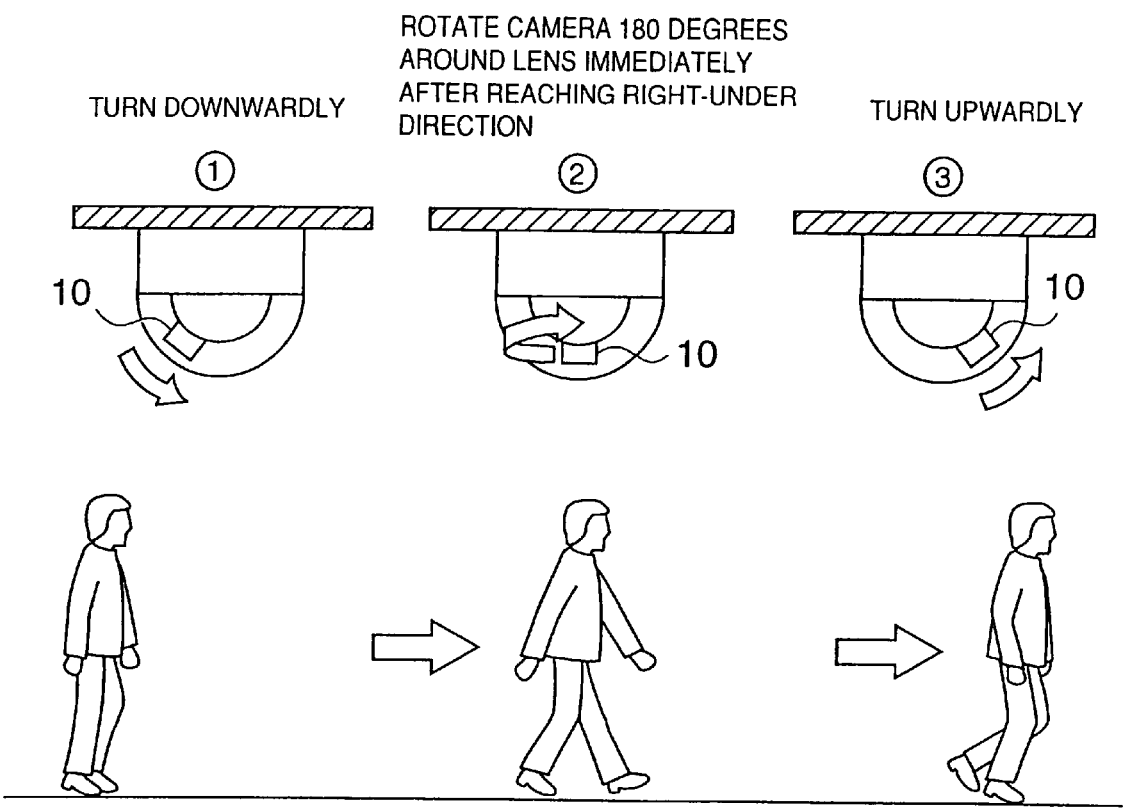
FIG. 19 is an illustration for describing an operation of a compound camera.
Figure 20:
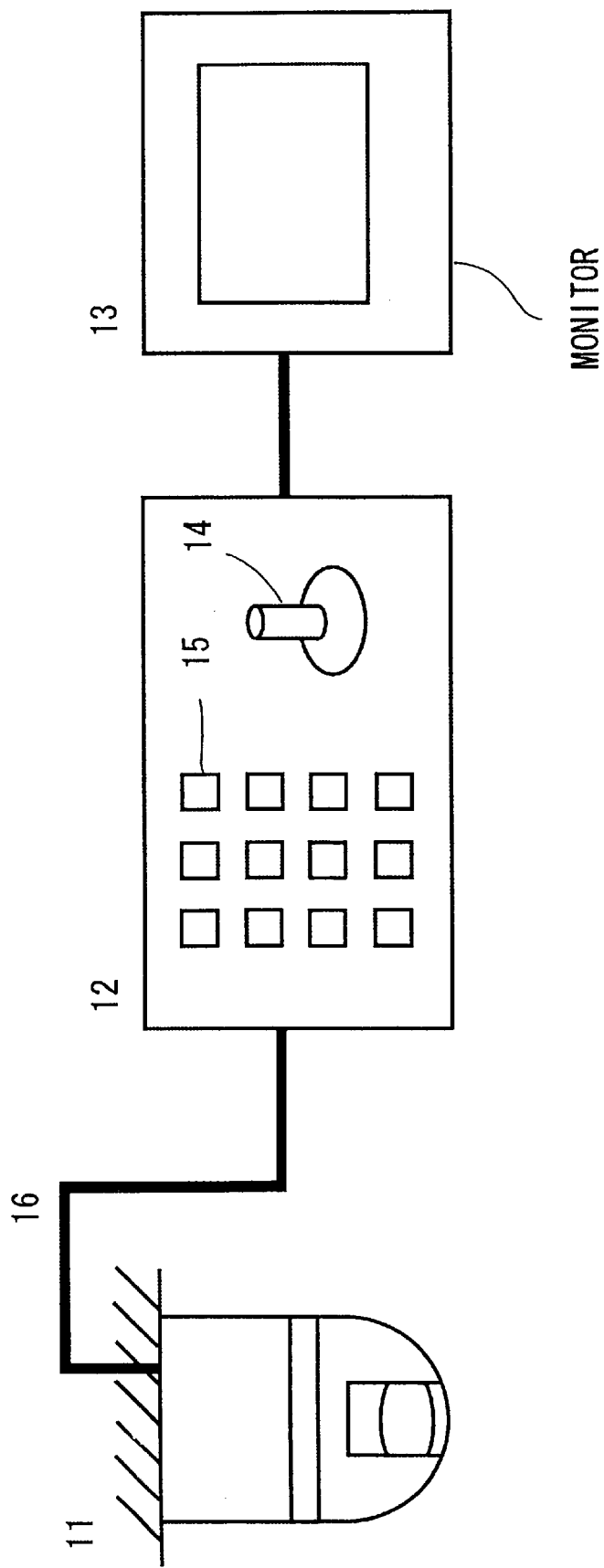
FIG. 20 is an illustration of a control system of a compound camera system.

When an operator tilts the joystick 14 of the controller 12 for changing the camera direction, in accordance with this manipulation, in addition to a command representative of camera speed control, the controller 12 transmits, to the compound camera 11, data Vpan indicative of the x-axis component of the tilting manipulation of the joystick 14 and data Vtilt indicative of the y-axis component thereof, shown in FIG. 18. In the compound camera 11, the camera control section 21 interprets the received command and communicates the data Vpan and the data Vtilt to the motor control section 22. The motor control section 22 controls the motor driver 23 so that the pan rotation is made at a speed of Vpan and further controls the motor driver 27 so that the tilt rotation is made at a speed of Vtilt.

When the operator returns the joystick 14 to the neutral position, likewise, the data Vpan=0 and Vtilt=0, together with a command, are sent to the compound camera 11, thereby ceasing the rotation in the panning and tilting directions.

At a change of the camera direction, the data Pt, Tt, Zt and Ft representative of the present state quantities are held as mentioned above. The camera control section 21 of the compound camera 11 compares the data Pt (pan angle) and Tt (tilt angle) with the pan angle range and the tilt angle range in the direction designation table. If the ranges including the present Pt and Tt exist, then the camera control section 21 outputs the corresponding direction indicating character code to a character generator 48. In addition, at this time, the camera control section 21 gives an instruction on an appearance position of the direction indicating character (designates a position at which the direction indicating character is displayed in a picture) to the character generator 48.

The CCD 44 picks up an image in the camera direction and outputs the corresponding video signal to the DSP 45, while the character generator 48 outputs a direction indicating character, to be displayed at the designated position, to the DSP 45.

The DSP 45 encodes the image on which the direction indicating character is superimposed, with the encoded image data being once written in the image memory 46 and then read out therefrom to be outputted to the monitor 13.

In this way, a picture on which the direction indicating character is superimposed at the designated position appears on the monitor 13.

Furthermore, in the controller 12, there is provided a switch 17 for selectively conducting the switching between display/non-display of the direction indicating character. When the operator selects the non-display through the use of the switch 17, a direction indicating character non-display command is fed to the compound camera 11 where the camera control section 21 ceases the display of the direction indicating character.

In addition, in this compound camera 11, in response to the designation on a direction, the camera thereof can automatically follow that direction.

For example, when the operator designates the direction "north" through the use of the personal computer 19 so that the camera takes that direction, the camera control section 21 of the compound camera 11 receives and interprets the command to read out a pan angle and a tilt angle on the basis of the "north" in the "display" column of the direction designation table of FIG. 7 retained in the memory 47. In this case, the data to be read out from the direction designation table are pan angle 90±a0 and tilt angle b1→90 in the fifth row, and pan angle 270±a0 and tilt angle −b1→−90 in the fourteenth row. The central angle of the pan range read out is selected as the pan angle, while a preset angle (in this case, ±b1) is set as the tilt angle. Accordingly, a first camera target position (P1=90, T1=b1) is set on the basis of the fifth row data, and a second camera target position (P2=270, T2=−b1) is set on the basis of the fourteenth row data.

Following this, the present state quantities Pt and Tt are read out to calculate the shortest of the paths (routes) from the present camera position to the first camera target position and the second camera target position.

In this compound camera 11, the possible moving paths from the present camera position (Pt, Tt) to one target camera position (P0, T0) are:
1. a path through which the target camera position is reached due to right-turning pan rotation and tilt rotation within the same region (that is, when the present tilt angle is in the positive region, the tilt rotation takes place in the positive arrival at the target camera position depends upon the larger one of the pan rotation angle and the tilt rotation angle.

On the selection of the shortest path, the camera control section 21 give an instruction to the motor control section 22 so that the pan rotation and tilt rotation take place according to the pan and tilt rotation angles for the selected moving path.

The motor driver 23 makes the motor 24 rotate by the pan rotation angle designated through the motor control section 22, and when detecting, on the basis of the output of the encoder 25, the fact that the motor 24 has rotated by the designated angle, ceases the rotation of the motor 24. Likewise, the motor driver 27 makes the motor 28 rotate by the tilt rotation angle designated through the motor control section 22, and when detecting, on the basis of the output of the encoder 29, the fact that the motor 28 has rotated by the designated angle, ceases the rotation of the motor 28. In consequence, the camera turns toward the north and the photographing starts.

In addition, the camera control section 21 outputs the "north" character code to the character generator 48 and designates the appearance position of the character "north".

The CCD 44 takes a picture in the camera facing direction, with the resultant video signal being outputted to the DSP 45. The character generator 48 outputs, to the DSP 45, the character "north" to be displayed at the designated position. The DSP 45 encodes the picture on which the character "north" region, while, if the present tilt angle is in the negative region, it takes place in the negative region);
2. a path to the target camera position due to left-turning pan rotation and tilt rotation in the same region;
3. a path to the target camera position due to tilt rotation for shifting into a different region (tilt rotation causing passing through the tilt angle of zero degree and shifting from the positive region to the negative region or from the negative region to the positive region) and right-turning pan rotation; and
4. a path to the target camera position due to tilt rotation into a different region and left-turning pan rotation.

For each of the moving paths, the pan rotation angle and the tilt rotation angle are as shown in FIG. 11. In the compound camera 11, the camera control section 21 obtains 4×2 moving paths from the present camera position to the first target camera position and the second target camera position, and the camera control section 21 takes note of the larger one of the pan rotation angle and the tilt rotation angle for each of the moving paths, and selects, as the shortest path, the moving path taking the smallest rotation angle. This is because, in a case in which the rotation in a panning direction and the rotation in a tilting direction are made concurrently for the shifting to the target camera position, the time taken for the is superimposed, with the encoded image data being once written in the image memory 46 and then read out from the image memory 46 to be outputted to the monitor 13.

At this time, in the selected shortest path, when the tilt rotation passes through zero degree and enters a different region (that is, in the case of the selection of the third or fourth moving path), the readout of the image data from the image memory 46 is conducted in the reverse order. This can prevent the reversal of the image to be displayed on the monitor 13. In addition, the camera control section 21 gives an instruction on the appearance position of the character "north" to the character generator 48 taking into consideration the image data readout direction from the image memory 46.

Furthermore, it is also appropriate that two points other than a tilt angle of zero are set as the points (camera positions) at which the image data readout direction is switched actually so that the image data readout direction is switched in a case in which the tile angle passes through one of these two points and advances to the minus side while the switching of the image data readout direction is canceled in a case in which the tilt angle passes through the other point and advances to the plus side. Thus, when the switching of the image data readout direction shows a hysteresis, frequent occurrence of image reversal in the vicinity of the switching points is preventable.

Secondly, a description will be given hereinbelow of a method of storing a direction designation table in the memory 47 of the compound camera 11.

In the stage of shipping of the compound camera 11 from a factory, the table shown in FIG. 7 is initially set in the memory 47. Following this, this compound camera 11 is installed on a predetermined place such as a ceiling of a building and then the initially set table is corrected to the actual directions at that place. For this correction, a camera after the installation is rotated manually so that, for example, it turns to "east". The camera control section 21 of this compound camera 11 compares the pan angle with respect to the pan origin at that time with the pan angle of the "east" direction to obtain a difference ($\alpha$) therebetween, and as shown in FIG. 12, adds the difference $\alpha$ to all the pan angles written in the initially set table.

In this way, the alignment with respect to one direction written in the table, at the same time, permits automatic correction of the data in other directions.

In addition, in this correction operation, it is also appropriate to, in place of the manual operation, use a controller or a personal computer for the rotation of the compound camera 11 and for the alignment. Still additionally, it is also appropriate to align the compound camera 11 to the reference direction for the maintenance of the direction designation table through the use of the controller or the personal computer whenever a predetermined period of time elapses after the installation of the compound camera 11.

In the case of the use of a personal computer for data correction, it is possible that the data in the direction designation table held in the compound camera 11 is once read in the personal computer and the data on the rotating quantity of the compound camera 11 up to the reference direction for the alignment is derived from the compound camera 11 so that the table correction is made through the personal computer and the corrected table data is loaded from the personal computer into the compound camera 11. Thus, it is possible to considerably reduce the arithmetic processing in the compound camera 11.

Furthermore, it is also appropriate that a direction sensor (gyro) is mounted on the compound camera 11 to adjust the camera direction to the direction, the direction sensor indicates, so that a difference between the pan angle at that time and the pan angle corresponding to "north" defined in the direction designation table is calculated to correct the table data on the basis of this difference. Still furthermore, in this case, further accuracy is attainable by inputting the latitude and longitude data on the installation location of the compound camera 11 to the personal computer for eliminating the effects of the earth magnetism on the gyro indicating direction.

Moreover, it is also possible that a character "upper", "middle" or "lower" is attached to a direction indicating character in accordance with a tilt angle to make a display of "north upper", "north middle" or "north lower" as shown in FIG. 8. In this case, as FIG. 9 shows, the tilt angle range in the direction indicating table is divided into a plurality of portions to set a indicating character corresponding to each of the divided portions.

Still moreover, in a case in which the pan angle of the compound camera 11 is out of the range denoted by the oblique lines in FIG. 5, it is also possible to additionally display an arrow indicative of a neighboring direction as a guide, for example, such that "north→", "←north", "northeast→", "←northeast". In this case, as FIG. 10A shows, each of the sections being out of the ranges indicated by the oblique lines is equally divided into two of the same angle and a guide indication containing a nearby direction and an arrow is set in the direction designation table in corresponding relation to each of the two divisions.

For example, in the angular range between (0+a0) and 45−a0), in a state where the intermediate angle (45/2) therebetween forms a boundary, in the range between (0+a0) and (45/2), the nearby "east" is indicated with an arrow such that (east→), while in the range between (45/2) and 45−a0), the nearby "northeast" is indicated by an arrow such that (←northeast) (however, in this case, let it be assumed that the tilt angle is between b1 and 90 degrees).

In addition, at this time, if the display position of the guide indicator is set previously in the direction designation table as shown in FIG. 10B, in accordance with the direction of the arrow, the guide indicator can be displayed at a right lower position or left lower position on a screen as shown in FIGS. 10C and 10D. According to such a display mode, the camera operator can clearly recognize the directionality.

Still additionally, it is also possible to conduct the switching between display/non-display of a direction indicating character or a guide indicator on the screen in connection with the camera rotating speed. For example, it is possible to display the direction indicating character only when the camera rotation is in stop or to display the guide indicator only at the initiation of the a joystick manipulation.

In this case, the camera control section 21 of the compound camera 11 interprets a command from the controller 12 and controls the instructions to the character generator 48 so that the display of a direction indicating character is ceased when a designation on camera rotation takes place or so that a guide indicator is displayed only when a designation on camera rotation takes place.

In this way, in a case in which a direction indicating character is displayed only during the stopping of the camera rotation, there is no need to calculate a direction at a high speed to the camera moving speed, which can lessen the operational load of the compound camera 11.

Furthermore, in a case in which a guide indicator is displayed only during a manipulation of the joystick 14, the camera manipulation by the operator becomes easy, and at the stopping of the camera rotation, the guide indicator does not hide a portion of a picture, thus providing an easy-to-see picture.

Still furthermore, if, in the direction designation table, a0 defining a departure or deviation (tolerance) of pan angle from the correct direction is set as a function of a field angle, that is, as a function (a0=$\phi$(Z)) of a zoom quantity Z, the tolerance on a display of a direction indicating character can be controlled in accordance with a field angle, thus reducing the tolerance when the zoom quantity is large (field angle is small).

In this case, in the compound camera 11, the camera control section 21 calculates a0=$\phi$(Zt) by using the data Zt of the data Pt, Tt, Zt and Ft indicative of the present camera state quantities, and only when the departure of the pan angle from the correct azimuth is in a range of ±a0, displays a direction indicating character on a screen.

In this way, by decreasing the tolerance when the field angle is small, it is possible to display a portion of the monitoring area in an enlarged condition for accurately aligning the camera direction with the target direction.

In addition, if the data Zt is compared with a threshold value, then it is also possible to cease the display of a direction indicating character in a case of a wide-angle picture in which the field angle exceeds a predetermined value, in other words, in a case in which the direction of the picture is recognizable without display of the direction.

Still additionally, when a0 is set as a function (a0=φ(x)) of a value x designated through the controller 12, the operator can determine the tolerance.

Moreover, in the case of a display of a direction indicating character, a camera direction and a departure (difference in angle) thereof from the indicated direction can additionally be displayed. In this case, in the compound camera 11, the camera control section 21 calculate the difference between the data Pt indicative of the present camera state quantity and the azimuth (the angle of the direction) to make a display of that difference through the use of the character generator 48. The operator can accurately accomplish the camera manipulation while viewing the difference displayed.

Still moreover, in a case in which a direction (azimuth) is designated to align the compound camera 11 in that direction, it is also possible to change a configuration on the controller 12 side so that the direction designation is possible by means of voice input.

(Second Embodiment)

A description will be given hereinbelow of a compound camera according to a second embodiment of the present invention. This compound camera can make a display in accordance with a camera facing direction to meet user's requirements.

Figure 15:
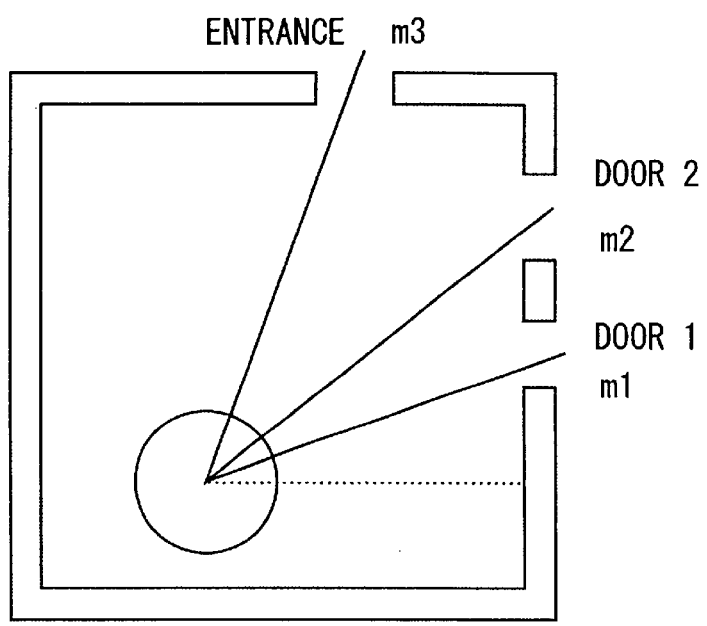
FIG. 15 is an illustration of targets with their names in a compound camera according to a second embodiment of the invention.

For example, as FIG. 15 shows, in the interior of a room installed, when this compound camera faces toward a door, a character (letter string) "door" is displayed at a lower end portion on a screen, and when it faces toward an entrance, "entrance" is displayed thereon.

Figures 16, 17A, 17B:
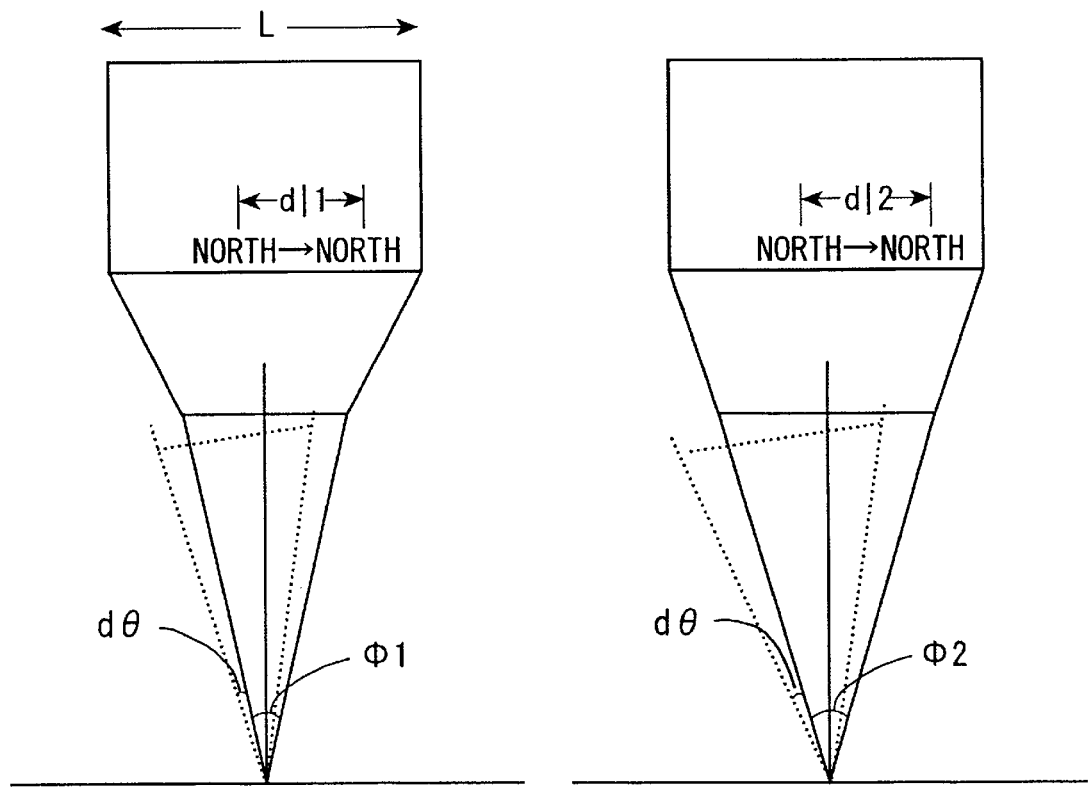
FIG. 16 is an illustration of a table to be held in the compound camera according to the second embodiment of the invention.
FIGS. 17A and 17B are illustrations useful for explaining a movement of an indicating character on a screen in a compound camera according to a third embodiment of the invention.

In this compound camera, as FIG. 16 shows, according to setting, in a memory 47, is stored a table (user customizing table) in which pan angles whose tolerance is set at ±a0, tilt angles whose tolerance is set at ±b0 and target indicating character codes for the indication of objects are written in corresponding relation to each other.

In this compound camera, as in the case of the first embodiment, when the data Pt and Tt representative of the present camera state quantities agrees with the pan angle and the tilt angle written in the user customizing table, the corresponding indicator (indication) appears on a monitor screen in a state superimposed on a picture.

Furthermore, for example, the operator designates "entrance", the pan angle and tilt angle corresponding to "entrance" are read out from the user customizing table shown in FIG. 16 so that the camera changes its direction to shift from the present camera position through the shortest path to a camera position at which the entrance is photographed. This operation is the same as that in the first embodiment.

Still furthermore, in this compound camera, for example, in a case in which "door" is inputted in the form of a wild card, in accordance with the rotation of the camera, pictures taken in the directions of the respective doors can be displayed in order together with object indicating characters, such as "door 1", "door 2". . . .

In this case, in the compound camera, the camera control section 21 reads out, by turns, the pan angle and tilt angle corresponding to a display including a character "door" from the user customizing table, and controls the rotatable tables in accordance with the pan angle and the tilt angle.

Secondly, a description will be given hereinbelow of a method of storing a user customizing table in the memory 47 of the compound camera.

Through the use of a building drawing of a building in which the compound camera is to be installed, the pan angle and the tilt angle for a display of each of targets are calculated on the basis of the positional relationship between the installation location and the target, and the calculation result data and the display name of the target are inputted for the initial setting of the user customizing table in the memory 47 of the compound camera. Subsequently, when this compound camera is actually installed in the building, the camera position is set to one target to calculate the difference (α) between the pan angle at that setting and the initially set value on that target so that the difference (α) is added to each of the pan angles corresponding to the respective targets, written in the initially set table. This manner can set the user customizing table while reducing the adjustment work in the compound camera installation site. In this case, it is also appropriate to calculate the pan angle and tilt angle for a display of each of the targets through the use of the CAD data on the building drawing.

In addition, it is also possible that, after the compound camera is installed in a building, the camera position is set to each of the targets through the use of a controller or a personal computer to register the resultant pan angle and tilt angle together with a character indicating the target, thus completing a user customizing table. Still additionally, in like manner, a correction of the user customizing table registered already is possible. In this case, if a wild card is put to use, it is possible to efficiently conduct the table correcting operation, for example, by correcting while displaying doors in order.

Furthermore, for example, in displaying an entrance according to the user customizing table, it is also possible to previously register the position of an indicating character on a screen in the user customizing table so that the character "entrance" appears at a position which does not interfere with the picture or a position which is in a black background but easy to see. This is similar to the case shown in FIG. 10B.

Still furthermore, while the camera rotates due to the control of the joystick 14, if the camera enters pan and tilt angle ranges in which a target registered in the user customizing table is displayed together with an indicating character, the compound can automatically reduce the rotating speed of the camera. This is because, since the target registered in the user customizing table forms an important monitoring point, it is preferable to display that position carefully at a low speed. In this case, when the present pan angle and tilt angle enter the pan and tilt angle ranges registered in the user customizing table, respectively, in the compound camera the camera control section 21 itself directly issues an instruction for speed reduction to the motor control section 22 without being controlled by the controller.

In addition, the methods including the guide indication of indicating a direction of a target with an arrow and the setting of a tolerance according to an field angle, described above in the first embodiment, are also applicable to the case using the user customizing table.

Still additionally, it is also possible that a direction designation table and a user customizing table are registered in the memory 47 of the compound camera so that a direction display and a target display are together displayed. In this case, it is also acceptable that, at a camera position where both a direction and target are displayed, priority is given to one of the tables so that a display is made according to only that table. This can avoid the complication of display on the screen.

(Third Embodiment)

A description will be given hereinbelow of a third embodiment of the present invention. The third embodiment relates to a display in which a character indicating a direction or a target (object) is shifted in opposite directions on a screen in the same manner in synchronism with a pan movement in a photographing direction.

The movement of an indicating character on a screen depends upon a pan speed and a zoom quantity (field angle). FIGS. 17A and 17B are illustrations of the fact that, regardless of the same pan speed (Vpan=dθ/dt), a moving quantity (d11, d12) of the indicating character on the screen varies with a field angle (φ1, φ2). FIG. 17A shows a case of a small field angle while FIG. 17B illustrates a case of a large field angle.

The field angle φ depends on a zoom quantity (Z) of the lens section. When the vertical length of the screen is taken to be L, the moving quantity d1 of the indicating character assumes the following relationship.

$$d\theta/\phi = -d1/L$$

Accordingly, $$\text{since } d\theta/dt = V\text{pan} = -\phi/L \cdot d1/dt, \ d1/dt = -V\text{pan} \cdot L/\phi$$

In the compound camera, when receiving a pan speed Vpan from a controller, the camera control section 21 calculates an indicating character moving speed (−Vpan·L/φ(Zt)) as a function of a field angle φ (Zt) depending on the present zoom state quantity (Zt) and the vertical length L of the screen, and gives an instruction on a display position of a direction display or a target indicating character to the character generator 48.

In consequence, the display position of the direction indicating character or the target indicating character shifts horizontally on the screen in synchronism with pan rotation. Therefore, an operator can understand the present camera position accurately and can easily align the camera position with a direction or a target.

Although the above-described embodiments relate to a compound camera capable of making 360-degree pan rotation and 180-degree tilt rotation, the present invention is applicable to a monitor camera system having at least one revolution axis.

As described above, with the monitor camera system and the displaying method according to the present invention, a character indicating a camera direction is displayed in a state superimposed on a picture, which allows the present camera position to be clearly recognized from a picture displayed on a monitor. Accordingly, in controlling the camera direction for monitoring a monitoring area, the operator can accurately and easily align the camera with a desired direction or a target.

In addition, in this monitor camera system, a direction indicating character indicative of a photographing direction or a target name indicating character is selectable through the internal processing to be superimposed on a picture, which contributes to prompt and appropriate image processing.

It should be understood that the foregoing relates to only preferred embodiments of the present invention, and that it is intended to cover all changes and modifications of the embodiments of the invention herein used for the purpose of the disclosure, which do not constitute departures from the spirit and scope of the invention.

What is claimed is:

1. A monitor camera system comprising:
    a monitor camera having at least one revolution axis, wherein
    said monitor camera generates and outputs image data in which a character for indicating a photographing direction of said monitor camera is superimposed on a picture taken by said monitor camera,
    said monitor camera includes a memory retaining a table setting the relationship between at least one of a pan angle and a tilt angle and said indicating character, and when one of the present pan angle and tilt angle of said monitor camera agrees with one of an pan angle and a tilt angle set in said table, the corresponding indicating character is superimposed according to the relationship set in said table, and
    a tilt angle in said table is determined so that said indicating character does not appear until a direction of said monitor camera reaches a predetermined angle with respect to its right-under direction.

2. The monitor camera system according to claim 1, wherein said indicating character is a direction indicating character representative of an azimuth.

3. The monitor camera system according to claim 1, wherein said indicating character is a name indicating character representative of a name of a target.

4. The monitor camera system according to claim 1, wherein one of a pan angle and a tilt angle in said table is set as an angle range containing a tolerance.

5. The monitor camera system according to claim 4, wherein said tolerance is set as a function of a zoom quantity and is set to be smaller as a picture to be displayed has a smaller field angle.

6. The monitor camera system according to claim 4, wherein, in said table, a guide indicator based on a combination of said indicating character and a direction indicating symbol is set for a pan angle range which is out of said tolerance.

7. The monitor camera system according to claim 1, wherein, when a photographing direction indication is made using a character corresponding to said indicating character set in said table, a position of said monitor camera is controlled to make a pan angle and a tilt angle set in said table in a state related to said indicating character.

8. The monitor camera system according to claim 7, wherein, in a case in which a target name indicating character is set in said table, an indicating character representative of a photographing direction is inputted to said monitor camera, all name indicating characters including said indicating character are extracted from said table so that a camera position of said monitor camera is controlled successively to pan angles and tilt angles set in a state related to all the extracted name indicating characters.

9. The monitor camera system according to claim 1, wherein all pan angles set in said table stored in said memory are corrected simultaneously in a manner that a camera position of said monitor camera is checked with one direction.

10. The monitor camera system according to claim 9, wherein a direction sensor is provided for the checking of said camera position.

11. The monitor camera system according to claim 1, wherein a table for setting the relationship between one of a pan angle and a tilt angle and a direction indicating character representative of a camera direction and a table for setting the relationship between one of a pan angle and a tilt angle and a name indicating character representative of a target name are stored in said memory, and when one of said pan angle and said tilt angle in one table overlaps with one of said pan angle and said tilt angle in the other table, priority on designation of said indicating character is given to the one table.

12. The monitor camera system according to claim 1, wherein, in a case in which said monitor camera is in rotation to change its direction in response to an instruction for rotation, when one of the present, pan angle and the present tilt angle agrees with one of said pan angle and said tilt angle, said monitor camera implements independent control to reduce its own rotating speed.

13. A picture displaying method for use in a monitor camera system including a monitor camera having at least one revolution axis, comprising the step of:
  superimposing on a picture, taken by said monitor camera, in said monitor camera before displayed, a character for indicating a photographing direction of said monitor camera, wherein
  said indicating character is not displayed until a direction of said monitor camera reaches a predetermined angle with respect to its right-under direction.

14. The picture displaying method according to claim 13, wherein said indicating character to be superimposed and displayed is a direction indicating character representative of an azimuth.

15. The picture displaying method according to claim 13, wherein said indicating character to be superimposed and displayed is a name indicating character representative of a name of a target.

16. The picture displaying method according to claim 13, wherein, in a case in which one of a pan angle and tilt angle of said monitor camera is shifted from one of correct pan and tilt angles, said indicating character is displayed when said pan angle or said tilt angle is within a tolerance.

17. The picture displaying method according to claim 16, wherein said tolerance is set to be smaller as a picture to be displayed has a smaller field angle.

18. The picture displaying method according to claim 16, wherein said tolerance is set by an operator.

19. The picture displaying method according to claim 16, wherein a difference between one of a pan angle and tilt angle of said monitor camera and one of a correct pan angle and a correct tilt angle is displayed.

20. The picture displaying method according to claim 16, wherein, in a case in which a pan angle of said monitor camera is out of said tolerance with respect to a correct pan angle, a guide indicator based on a combination of an indicating character corresponding to the most nearby correct pan angle and a direction indicating symbol showing a direction to the most nearby correct angle is displayed.

21. The picture displaying method according to claim 20, wherein said guide indicator is displayed in a state shifted in a direction said direction indicating symbol points out on a screen.

22. The picture displaying method according to claim 20, wherein said guide indicator is displayed only when said monitor camera is driven through a manipulation.

23. The picture displaying method according to claim 14, wherein, when said direction indicating character is displayed as said indicating character, said direction indicating character is displayed in a state where an indicator set according to division of a tilt angle range taken by said monitor camera is added thereto.

24. The picture displaying method according to claim 13, wherein, when a field angle of said picture taken by said monitor camera exceeds a predetermined value, the display of said indicating character does not take place.

25. The picture displaying method according to claim 13, wherein said indicating character is displayed only when a moving speed of said monitor camera assumes zero.

26. The picture displaying method according to claim 13, wherein said direction indicating character and a name indicating character representative of a name of an object are displayed as said indicating character.

27. The picture displaying method according to claim 26, wherein said direction indicating character indicative of a photographing direction of said monitor camera and a name indicating character indicative of a name of a target existing in said photographing direction are displayed as said indicating character.

28. The picture displaying method according to claim 13, wherein priority is given to one of said direction indicating character indicative of a photographing direction of said monitor camera and a name indicating character indicative of a name of a target existing in said photographing direction, and only the one indicating character to which the priority is given is displayed as said indicating character.

29. The picture displaying method according to claim 13, wherein said indicating character is shifted on a screen in synchronism with movement of said picture.

30. The picture displaying method according to claim 29, wherein the shifting of said indicating character on said screen is adjusted in accordance with a moving speed of said monitor camera and a field angle of said picture.

* * * * *